United States Patent
Heitmann et al.

(10) Patent No.: US 11,566,883 B2
(45) Date of Patent: Jan. 31, 2023

(54) CUTTING SHARPNESS DETECTION DEVICE

(71) Applicant: CLAAS Selbstfahrende Erntemaschinen GmbH, Harsewinkel (DE)

(72) Inventors: Christoph Heitmann, Warendorf (DE); Dennis Neitemeier, Lippetal (DE); Markus Brune, Harsewinkel (DE); Jochen Huster, Guetersloh (DE); Frédéric Fischer, Arnsberg (DE); Bjoern Stremlau, Recke (DE)

(73) Assignee: CLAAS Selbstfahrende Erntemaschinen GmbH, Harsewinkel (DE)

(*) Notice: Subject to any disclaimer, the term of this patent is extended or adjusted under 35 U.S.C. 154(b) by 511 days.

(21) Appl. No.: 16/815,221

(22) Filed: Mar. 11, 2020

(65) Prior Publication Data

US 2020/0363184 A1  Nov. 19, 2020

(30) Foreign Application Priority Data

May 16, 2019 (DE) .................... 10 2019 112 968.0
May 16, 2019 (DE) .................... 10 2019 112 973.7
Jul. 1, 2019 (DE) .................... 10 2019 112 965.6

(51) Int. Cl.
*G01B 7/293* (2006.01)
*A01D 41/127* (2006.01)
(Continued)

(52) U.S. Cl.
CPC ........... *G01B 7/293* (2013.01); *A01D 41/127* (2013.01); *A01D 41/1271* (2013.01);
(Continued)

(58) Field of Classification Search
USPC .................................................. 73/579, 593
See application file for complete search history.

(56) References Cited

U.S. PATENT DOCUMENTS 6,931,828 B2  8/2005  Kormann
7,024,924 B2  4/2006  Heinrich et al.
(Continued)

FOREIGN PATENT DOCUMENTS

DE       10235919 A1    2/2004
DE    102011005317 A1    9/2012
(Continued)

OTHER PUBLICATIONS

European Search Report dated Sep. 23, 2020 issued in European Patent Application No. 20156365 (with English translation of relevant parts).
(Continued)

*Primary Examiner* — John Fitzgerald
*Assistant Examiner* — Truong D Phan
(74) *Attorney, Agent, or Firm* — Collard & Roe, P.C.

(57) ABSTRACT

A detection arrangement for detecting a wear status of a chopping knife arrangement of a chopping device provided for processing a product flow, wherein the chopping device has a revolving chopping drum receiving the chopping knife arrangement and at least one shear bar which cooperates with the chopping knives, with a sensor arrangement which has a magnetic exciter arrangement and a flux conducting device magnetically coupled thereto. The sensor arrangement provides a pole arrangement which forms at least one magnetic pole with a pole surface for conducting magnetic flux, wherein at least a portion of the chopping knife passes the pole arrangement during a rotation of the chopping drum. A voltage induced when a chopping knife arrangement passes the sensor arrangement forms the measured (Continued)

magnetic value, which is used by the evaluation unit to determine the state of wear of the chopping knife arrangement.

19 Claims, 7 Drawing Sheets

(51) Int. Cl.
| | |
|---|---|
| *A01D 43/08* | (2006.01) |
| *A01F 29/09* | (2010.01) |
| *A01F 29/22* | (2006.01) |
| *G01B 7/14* | (2006.01) |
| *B02C 18/18* | (2006.01) |
| *B26D 7/12* | (2006.01) |
| *B60W 50/00* | (2006.01) |
| *B60W 50/08* | (2020.01) |
| *G01B 7/02* | (2006.01) |

(52) U.S. Cl.
CPC .......... *A01D 43/085* (2013.01); *A01F 29/095* (2013.01); *A01F 29/22* (2013.01); *B02C 18/186* (2013.01); *B26D 7/12* (2013.01); *G01B 7/14* (2013.01); *B02C 2018/188* (2013.01); *B02C 2210/02* (2013.01); *B60W 50/0098* (2013.01); *B60W 50/085* (2013.01); *B60W 2300/158* (2013.01); *B60W 2710/30* (2013.01); *G01B 7/023* (2013.01)

(56) References Cited

U.S. PATENT DOCUMENTS

| | | |
|---|---|---|
| 7,222,804 B2 | 5/2007 | Wolf et al. |
| 9,288,941 B2 | 3/2016 | Pollklas |
| 10,568,271 B2 | 2/2020 | Neitemeier et al. |
| 2004/0182061 A1* | 9/2004 | Pirro ................ A01F 29/095 56/16.4 R |
| 2005/0072135 A1 | 4/2005 | Kormann |
| 2012/0293157 A1 | 11/2012 | Loebe et al. |
| 2016/0052525 A1 | 2/2016 | Tuncer et al. |
| 2018/0235154 A1 | 8/2018 | Neitemeier et al. |
| 2019/0289787 A1 | 9/2019 | Heitmann et al. |

FOREIGN PATENT DOCUMENTS

| | | |
|---|---|---|
| DE | 102014218408 A1 | 4/2015 |
| DE | 10 2017 201 423 A1 | 8/2018 |
| DE | 102017103537 A1 | 8/2018 |
| DE | 102917201421 A1 | 8/2018 |
| DE | 10 2018 116 237 A1 | 1/2019 |
| DE | 102018106915 A1 | 9/2019 |
| DE | 10 2020 125 513 A1 | 3/2022 |
| DE | 10 2020 126 099 A1 | 4/2022 |
| DE | 10 2020 128 502 A1 | 5/2022 |
| DE | 10 2020 128 518 A1 | 5/2022 |
| EP | 0 943 888 A2 | 9/1999 |
| EP | 1 386 534 A1 | 2/2004 |
| EP | 1 442 652 A1 | 8/2004 |
| EP | 1522214 A2 | 4/2005 |
| EP | 1 537 772 A1 | 6/2005 |
| EP | 2225931 A1 | 9/2010 |
| EP | 2 559 334 A1 | 2/2013 |
| EP | 2 735 222 A1 | 5/2014 |
| EP | 2764767 A2 | 8/2014 |
| EP | 3 825 657 A1 | 5/2021 |

OTHER PUBLICATIONS

European Search Report dated Jun. 15, 2020 issued in European Patent Application No. 20156359 (with English translation of relevant parts).

\* cited by examiner

CUTTING SHARPNESS DETECTION DEVICE

CROSS-REFERENCE TO RELATED APPLICATIONS

This application claims priority under 35 USC 119 of German Application No. DE 10 2019 112 968.0, filed on May 16, 2019, German Application No. DE 10 2019 112 973.7, filed on May 16, 2019 and German Application No. DE 10 2019 112 965.6, filed on Jul. 1, 2019, the disclosure of which is herein incorporated by reference.

BACKGROUND OF THE INVENTION

The invention is directed to a device for detecting the wear status of a chopping knife arrangement of a chopping device provided for processing a product flow.

A generic sensor arrangement which detects the revolving knives of a chopping drum arrangement by means of inductive sensors and derives a wear status of the chopping knives from the determined magnetic flux is known from DE 10 2017 103 537. Wear is determined from the induced voltage.

In addition, a similar cutting sharpness detection device is known, inter alia, from EP 1 522 214. In this case, optical sensors such as camera systems, lasers and near infrared sensors are used as detection devices.

Optical sensors have the problem particularly that the cutting edge analysis is made more difficult by the high revolving speeds of the chopping knives, which often leads to poor-quality analysis results. On the other hand, the analysis of an induced voltage is influenced appreciably less by the high revolving speeds of the chopping knives to be detected. However, the evaluating process which is exclusively directed to the induced voltage does not always lead to a sufficiently accurate estimation of a wear status.

SUMMARY OF THE INVENTION

Therefore, it is the object of the invention to avoid the disadvantages of the prior art described above and, in particular, to configure and further develop the known detection arrangements in such a way that the detection of the wear status of the chopping knives can be improved, particularly made more accurate, through simple means.

This object is met according to the invention by a detection arrangement for detecting a wear status of a chopping knife arrangement of a chopping device provided for processing a product flow that is constructed as an inductive detection arrangement, and the voltage induced when a chopping knife arrangement passes over the sensor arrangement forms the magnetic measured variable. The detection arrangement determines the induced voltage and records it as a voltage signal, the voltage signal is resolved into its frequency components in the evaluating unit by means of frequency analysis, the frequency components are separated into frequency components of a fundamental oscillation and into frequency components of a superposed oscillation which cause signal distortion, and the separated frequency components of the superposed oscillation which cause a signal distortion are inverse-transformed in the time domain. A measurement for the wear status and/or the cutting sharpness of a chopping knife is derived from the inverse-transformed frequency components of the superposed oscillation.

In an advantageous configuration of the invention, the frequency components comprise the amplitude and the phase of the respective voltage signal so that a fast signal analysis is possible by means of known mathematical analysis methods, preferably Fourier analysis.

In that, by means of Fourier analysis, the respective voltage signal is classified into frequency components of a fundamental oscillation and frequency components of a superposed oscillation which cause signal distortions, and the frequency components representing the fundamental oscillation are not taken into account in the derivation of the wear status and/or of the cutting sharpness of the respective chopping knife, it is ensured in an advantageous further development of the invention that only those frequency components which change significantly depending on the wear of the chopping knives and which are therefore suitable as indicators for qualifying wear or knife sharpness are taken into account. A particularly advantageous configuration results in this respect when the amplitude of the respective voltage signal of the frequency components causing a signal distortion is taken into account because this amplitude is a measurement for assessing the wear status and/or cutting sharpness of the respective chopping knife and can be determined in a simple manner.

A sensor arrangement or the plurality of sensor arrangements are positioned at the circumference of the chopping drum such that every chopping knife of the chopping drum is detected by means of a sensor arrangement. In this way, it is ensured that each chopping knife positioned at the circumference of the chopping drum can be detected. This effect is also achieved in a further advantageous configuration in that right-hand-side and left-hand-side chopping knife arrangements are associated with the chopping drum and at least one sensor arrangement is associated with each of these chopping knife arrangements.

A high-resolution and therefore very precise analysis of the wear status and knife sharpness is achieved in an advantageous further development of the invention in that a plurality of induction sensors, preferably five induction sensors, are associated with each sensor arrangement and each induction sensor generates a voltage signal, and each of the generated voltage signals is preferably analyzed separately and, further preferably, a plurality of voltage signals, or all of the voltage signals, of a detected chopping knife are combined to form one or more voltage signals prior to an analysis.

The sharpness status or wear status of the chopping knife can be determined in a simple manner when a "sharp knife" reference value is stored in the evaluating unit and/or in some other data processing device and, when it falls below this reference value, a grinding signal is generated. Further preferably, the reference value forms an amplitude of the voltage signal indicating a sharp knife. In this connection, alternatively or additionally, it is also advantageous when the generation of a grinding signal preferably includes the generation of an informatory signal, preferably the visualization of that chopping knife that falls below the reference value.

In an advantageous configuration of the invention, the operator of the agricultural harvesting machine is especially relieved also in that the generation of a grinding signal further preferably comprises a triggering of a grinding process.

In an advantageous further development of the invention, a particularly efficient monitoring of the wear status or chopping knife sharpness, particularly with respect to different types of wear occurring on the chopping knives, is made possible when the assessment of the cutting sharpness is effected by means of evaluation criteria, and the evaluation criteria are one or more of the evaluation criteria comprising "grinding surface length of the respective chopping knife", "roundness of the chopping knife tip", "general knife wear" and/or "camber of the chopping knife" or "relative distance of the shear bar from the chopping knife".

In an advantageous configuration of the invention, a reference value is stored in the evaluating unit and/or some other data processing device for every evaluation criterion, and a grinding signal and/or a knife change signal is generated when falling below this reference value, further preferably in that the reference value is an amplitude of a voltage signal such that optimum control can be carried out according to the respective selected evaluation criterion. In this respect, in an advantageous configuration of the invention, it is advantageous when the generation of a grinding signal preferably includes the generation of an informatory signal, preferably the visualization of that chopping knife falling below the reference value.

In an advantageous configuration of the invention, the operator of the agricultural harvesting machine is especially relieved also in that the generation of a grinding signal further preferably comprises a triggering of a grinding process and/or the information to exchange a chopping knife.

Due to the fact that the induced voltage increases with increasing roundness of the cutting edge of the chopping knives, the reference value is an amplitude of the voltage signal indicating a "roundness of the chopping knife tip".

Since the oscillation period of the induced voltage increases with increasing grinding surface length of the chopping knife, the reference value can be an oscillation period of the voltage signal indicating "grinding surface length of the respective chopping knife".

Due to the fact that both the oscillation period as well as the amplitude of the induced voltage increases significantly with increasing general wear of the chopping knife, the reference value comprises an amplitude and an oscillation period of the voltage signal indicating "general knife wear".

As the wear of the chopping knives increases, the distance thereof from the shear bar increases and the amplitude of the induced voltage decreases significantly so that the reference value is an amplitude of the voltage signal indicating "camber of the chopping knife" or "relative distance of the shear bar from the chopping knife".

BRIEF DESCRIPTION OF THE DRAWINGS

Further advantageous configurations are the subject of further subclaims and are described in the following with reference to an embodiment example shown in the figures. In the drawings:

DETAILED DESCRIPTION OF THE EMBODIMENTS

Figure 1:
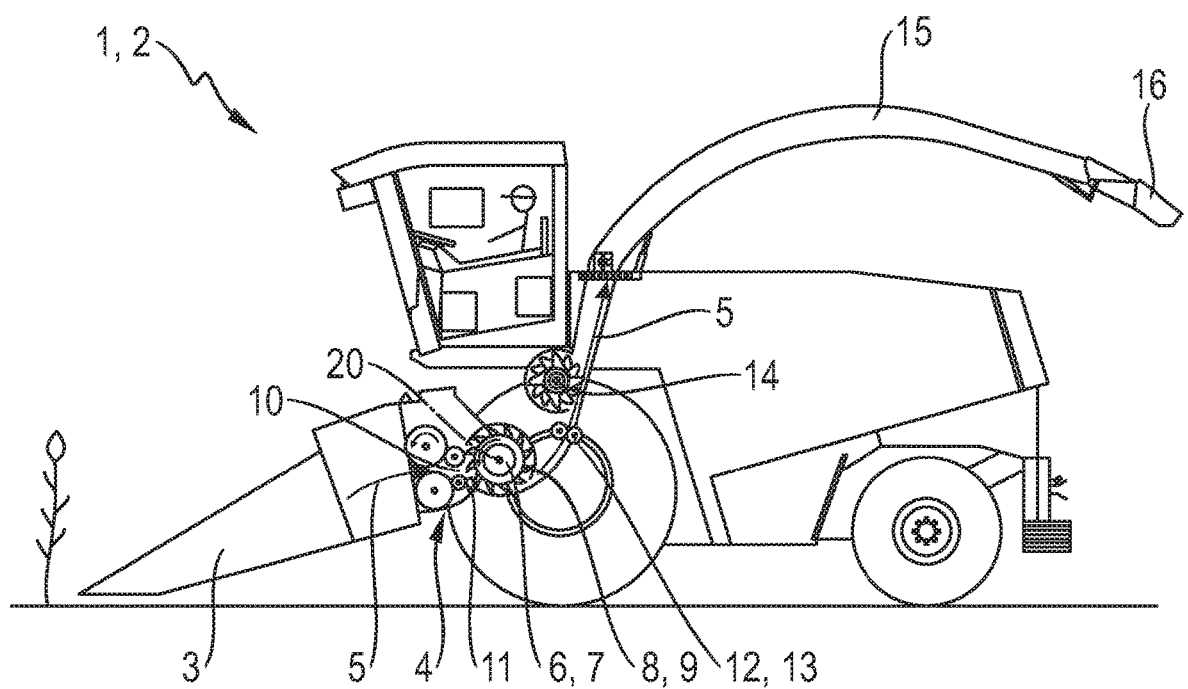
FIG. 1 shows a forage harvester with cutting sharpness detection device according to the invention.

FIG. 1 schematically shows an agricultural work machine 1 which is constructed as a forage harvester 2 and which receives a harvesting header 3 in the front area thereof. Gathering and pre-compacting rollers 4 which accept the crop flow 5 coming from the harvesting header 3, compress it and transfer it to a chopping device 6 in the rear area is associated with the header 3 in the rear area thereof. In a manner to be described further, the chopping device 6 comprises a chopping drum 7 which is outfitted with chopping knives 8 of a chopping knife arrangement 9. In the feed-in area 10 of the chopping drum 7, the revolving chopping knives 8 are moved past a shear bar 11 by means of which the crop flow 5 to be comminuted is conveyed. In the rear area of the chopping drum 7, the comminuted crop 5 is then transferred either to an after-comminution device 13 constructed as a so-called cracker 12 or directly to an after-acceleration device 14. While the after-comminution device 13 further comminutes the grain constituents of the crop flow 5, e.g., corn kernels, the after-acceleration device 14 accelerates the crop flow 5 such that this crop flow 5 can be moved through a deflector 15 and exit from the forage harvester 2 at the end in the area of a deflector flap 16 and can be transferred to a transport vehicle, not shown.

Figure 2:
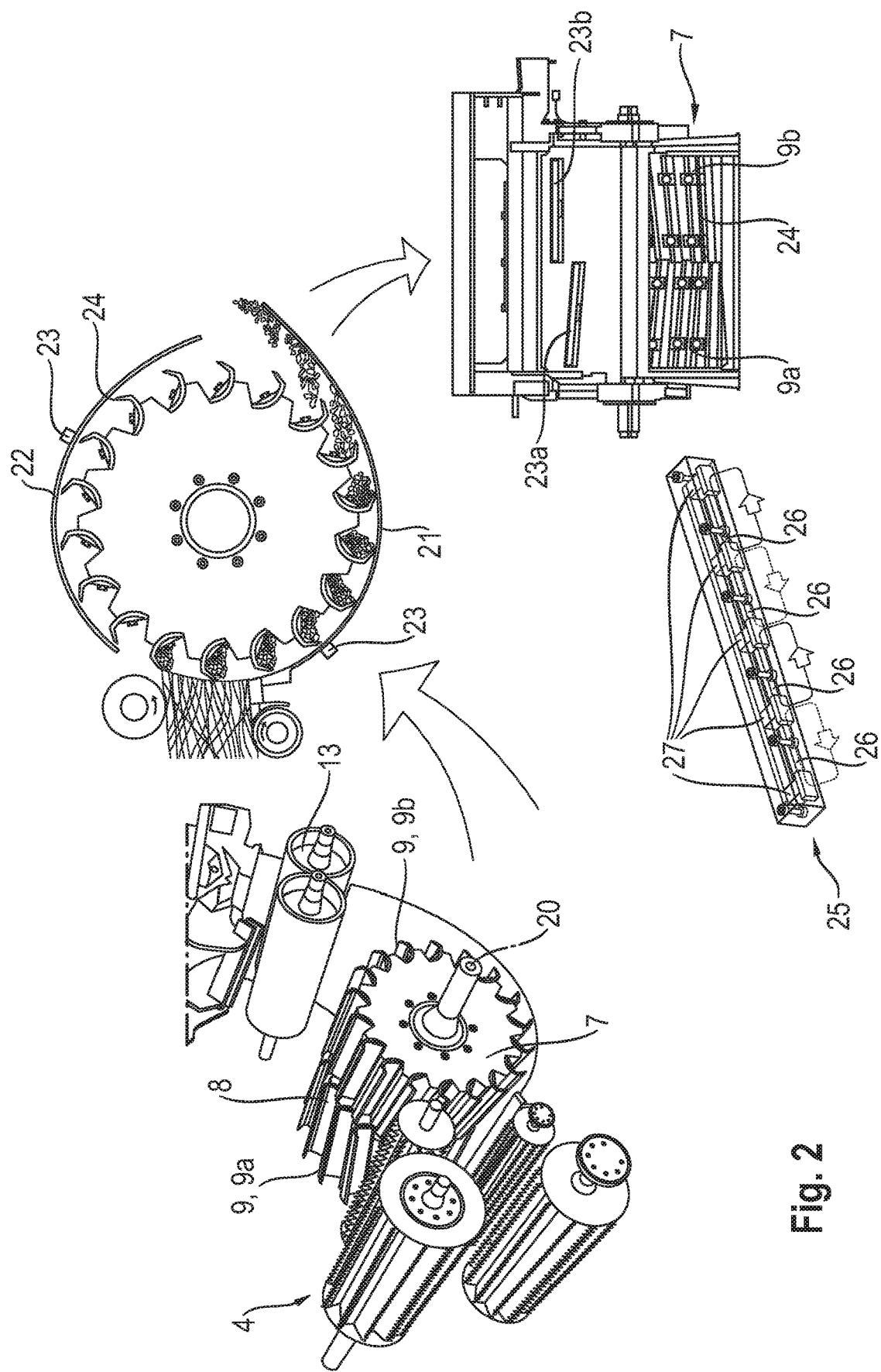
FIG. 2 shows a detailed view of the forage harvester according to FIG. 1 with cutting sharpness detection device according to the invention.

According to FIG. 2, the chopping knife arrangement 9 comprises right-hand-side and left-hand-side chopping knife arrangements 9a, 9b. Each chopping knife arrangement 9a, 9b comprises a plurality of chopping knives 8 positioned oblique to the rotational axis 20 of the chopping drum 7 at the circumference of the chopping drum 7. The chopping drum 7 is sheathed on the underside by a drum base 21 preferably comprising stainless steel. At the upper side, the chopping drum 7 is enclosed by a rear drum wall 22 which likewise preferably comprises stainless steel. The sensor arrangement 23 according to the invention which will be described in more detail later can be positioned either at the rear drum wall 22 according to the embodiment example shown in FIG. 2 or at the drum base 21. It is also conceivable that a sensor arrangement 23 is arranged both at the drum base 21 and the rear drum wall 22 at the same time. Regardless of the specific position, at least two sensor arrangements 23a, 23b are associated with every chopping drum 7 in such a way that one of the sensor arrangements 23a, 23b is associated in each instance with the associated chopping knife arrangement 9a, 9b, respectively. Each sensor arrangement 23a, 23b completely covers the cutting edge 24 of the respective chopping knife 7 so that each cutting edge 24 can be detected over its entire length by the respective sensor arrangement 23a, 23b. Further, it lies within the scope of the invention that the respective sensor arrangement 23a, 23b is positioned either parallel to the rotational axis 20 of the chopping drum 7 or parallel to the cutting edge 24 of the chopping knives 8 at the drum base 21 and/or rear drum wall 22. The view at lower right in FIG. 2 shows the possible orientations of the sensor arrangements 23a, 23b depicted individually merely by way of example. All of the sensor arrangements 23a, 23b are preferably positioned either parallel to the rotational axis 20 of the chopping drum 7 or parallel to the cutting edge 24 of the chopping knives 8. In the depicted embodiment example, the sensor arrangements 23a, 23b are constructed as induction sensors 25 to be described more fully in the following. Each sensor arrangement 23 comprises one or more magnetic exciter arrangements 26 and, in each instance, a pole arrangement 27 cooperating with the latter.

Figure 3:
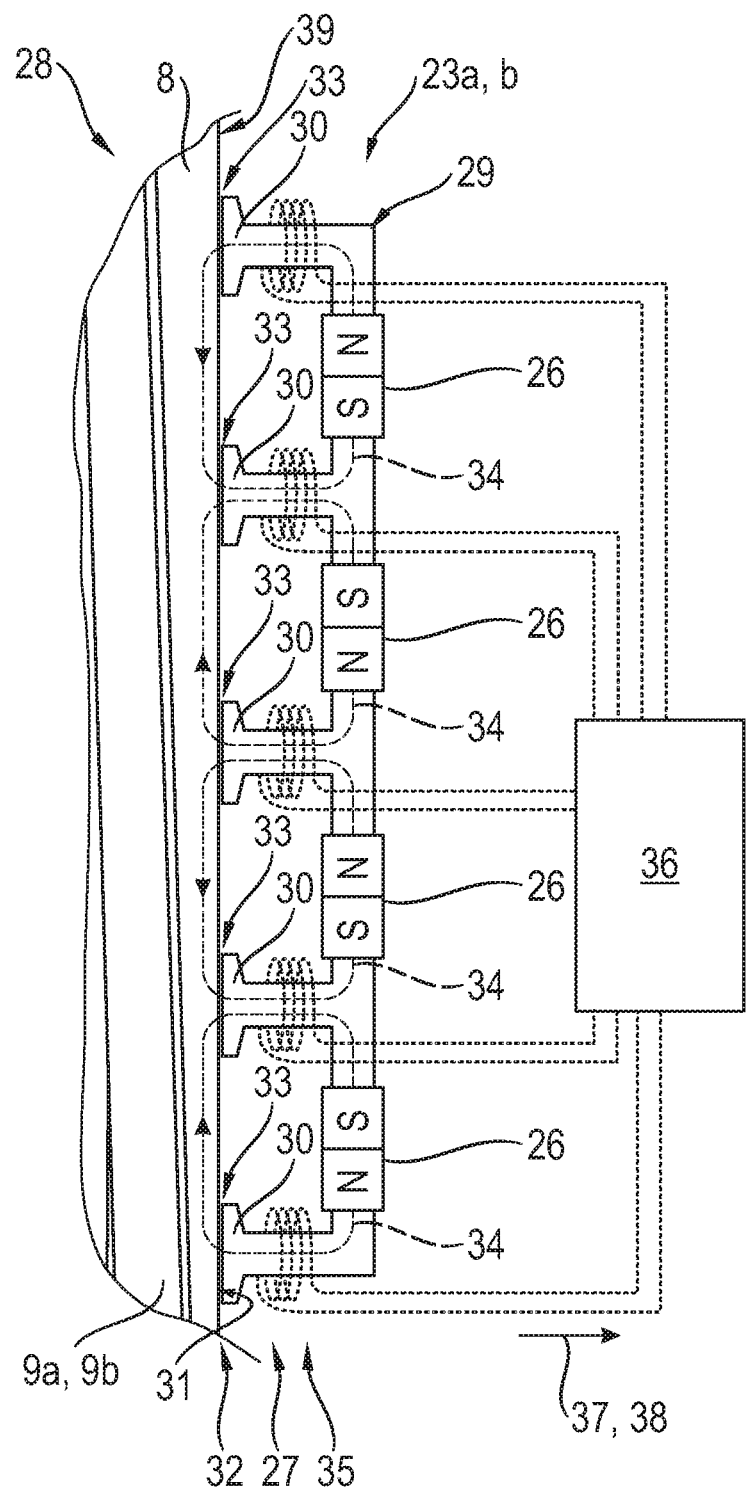
FIG. 3 shows a detailed view of the inductive sensor arrangement.

FIG. 3 depicts some characteristics of the sensor arrangements 23a, 23b which are key to understanding the invention. The further details of the sensor arrangements are given in DE 10 2017 103 537 A1, the disclosure of which is hereby incorporated by reference in its entirety herein. The detection arrangement 28 according to the invention for detecting a wear status of a chopping knife arrangement 9a, 9b comprises a plurality of sensor arrangements 23a, 23b, preferably for each chopping knife arrangement 9a, 9b. Every sensor arrangement 23a, 23b is formed by a plurality of magnetic exciter arrangements 26 which are coupled with a flux conducting device 29. The respective sensor arrangement 23a, 23b provides a pole arrangement 27 which forms at least one magnetic pole 30, preferably five magnetic poles 30, with a pole surface 31 in each instance for conducting magnetic flux. During a rotation of the chopping drum 7, a chopping knife 8 passes the respective pole arrangement 27, and the chopping knife 8 passing the pole arrangement 27 forms an air gap arrangement 32 with at least one air gap 33 with respect to the pole arrangement 27, and at least one magnetic circuit 34 excited by the exciter arrangement 26 is accordingly closed via the respective chopping knife 8. The detection arrangement 28 further has a measuring arrangement 35 and an evaluating unit 36. In a manner according to the invention which will be described more fully later, the measuring arrangement 35 detects at least one measured magnetic value 37 pertaining to the magnetic flux, preferably an induced voltage 38 in at least one magnetic circuit 34 excited by the exciter arrangement 26, and the evaluating unit 36 determines the wear status 39 of the respective chopping knife 8 from the at least one detected measured value 37.

Figure 4:
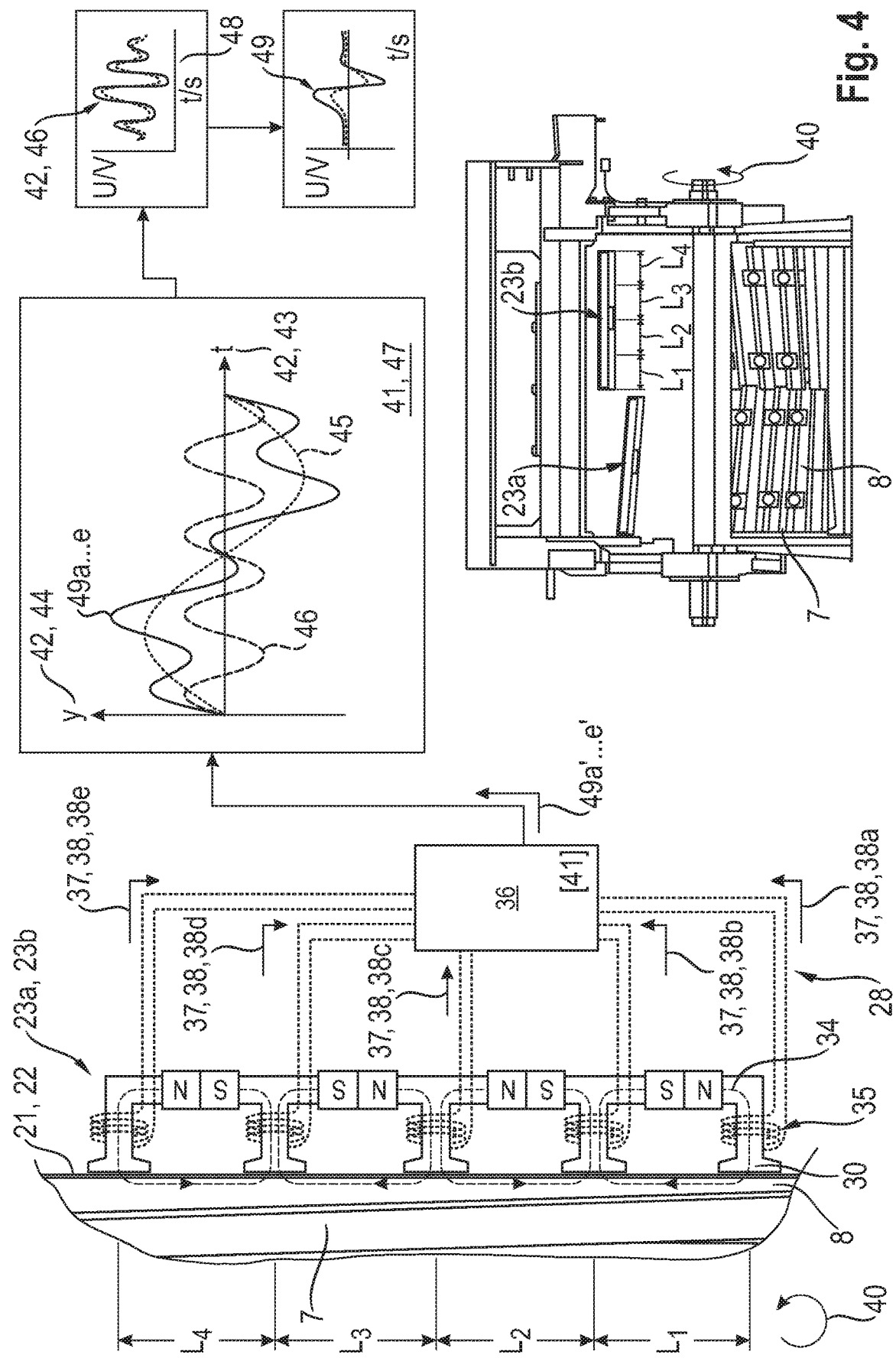
FIG. 4 shows a schematic view of the frequency analysis according to the invention.

Details of the device according to the invention will now be described referring to FIG. 4. During operation of the chopping drum 7, the chopping knives 8 are guided past the respective sensor arrangement 23a, 23b according to the rotational direction 40 of the chopping drum 7. Owing to the virtually non-magnetic properties of the rear drum wall 22 or of the drum base 21 which preferably comprises stainless steel, the magnetic circuits 34 formed by adjacent magnetic poles 30 penetrate the chopping knife 8 passing over the sensor arrangement 23a, 23b, respectively. In the depicted embodiment example, four magnetic circuits 34 which penetrate the respective chopping knife in four sections L1 to L4 are formed between the five poles 30. For each of these sections L1 to L4, a voltage 38, i.e., the measured magnetic value 37, is induced in the measuring arrangement 35 associated with each section L1 to L4. The evaluating unit 36 associated with the detection arrangement 28 determines and records the section-by-section induction voltage 38a-e in each instance. In this respect, it lies within the scope of the invention that the respective sensor arrangement 23 has more or less than the disclosed five magnetic poles 30 so that there can also be more or less than five induced voltages 38a-e. It also lies within the scope of the invention that the voltage signals 38a-e can be combined to form one or more voltage signals 38 for each chopping knife 8 detected.

The respective voltage signal 38a . . . e is converted in the evaluating unit 36 into a voltage signal 49a . . . e which can be further processed. This voltage signal 49a . . . e which can be further processed is formed in such a way that the induced voltage 38, i.e., the reference value 38 of the induced voltage, is initially determined for a sharp, unworn chopping knife 8, the induction voltage 38a . . . e which changes contingent on wear is then determined during the operation of the chopping knife 8 and, lastly, the voltage signals 49a . . . e which can be further processed are determined from the difference of the wear-dependent change in induction voltage 38a . . . e minus the reference value 38 of the induced voltage of an unworn chopping knife 8.

The respective voltage signals 49a . . . e is then resolved into its frequency components 42, preferably oscillation period or phase 43 and amplitude 44, in the evaluating unit 36 in a manner known per se by means of frequency analysis 41, preferably by means of Fourier analysis 47. In doing so, the respective induced voltage signal 49a . . . e is separated into frequency components 42 of a fundamental oscillation 45 and into frequency components 42 of a superposed oscillation 46 which cause signal distortions. The separated frequency components 42 causing a signal distortion, i.e., the so-called superposed oscillation 46, are then inverse-transformed in the time domain 48 in a manner to be described more fully later and, lastly, a measurement for the cutting sharpness, i.e., the wear status 39, of a chopping knife 8 is derived from the inverse-transformed frequency components 42 in a manner which will likewise be described more fully later.

Figure 5:
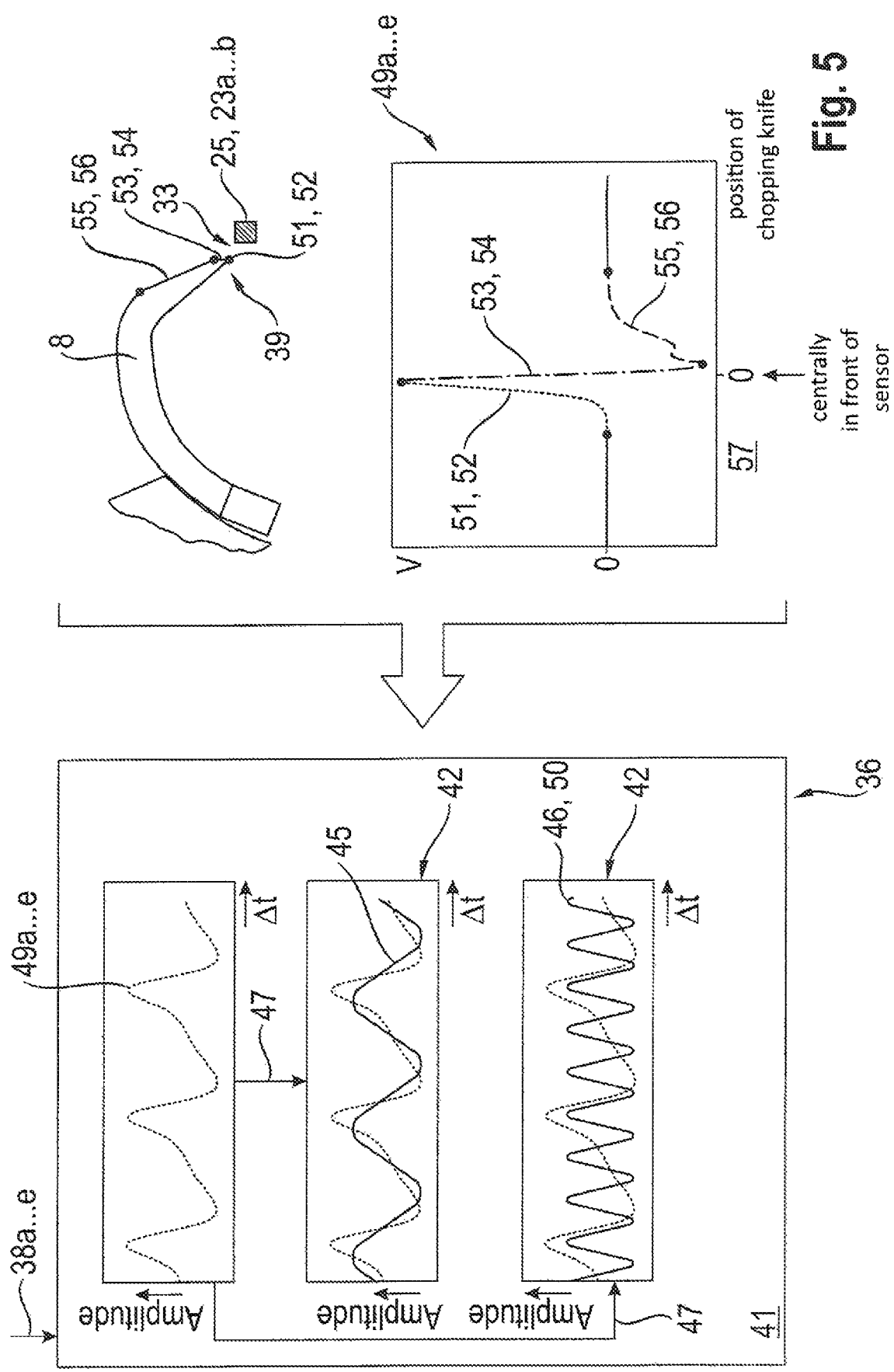
FIG. 5 shows a detailed view of the frequency analysis according to the invention.

The frequency analysis 41 carried out according to the invention by the evaluating unit 36 is shown schematically in detail in FIG. 5. The voltage signal 49a-e derived in each instance from the induced voltage 38a-e is initially derived in the manner described above. The respective voltage signal 49a . . . e is then resolved into its frequency components 42 by means of Fourier analysis 47. In this case, as has already been described, a fundamental oscillation 45 and one or more superposed oscillations 46, so-called harmonics 50, causing the signal distortions are separated. When a chopping knife 8 moves past the sensor arrangement 23a,b formed as induction sensor 25, the respective chopping knife 8 changes the permeability in the air gap 33 in front of the sensor arrangement 23a,b. Consequently, the magnetic induction changes. This change can be measured by means of the respective induced voltage 38a . . . e. Regardless of whether its cross-sectional shape is curved or planar, a typical chopping knife 8 comprises essentially three characteristic areas. The first area 51 defines the roundness of the knife tip 52 and is determined by its radius; the smaller its radius, the sharper a chopping knife 8 is. The so-called grinding surface length 54 defines a further area 53. An increasing grinding surface length 54 is a measurement for increasing wear 39 of the respective chopping knife 8. Lastly, the so-called knife back 56 is distinguished as the third area 55; its shape and quality can be utilized as a measurement for describing the general wear status 39 of the respective chopping knife 8. The general wear status and wear are both denoted in the following as wear 39 for reasons of simplicity.

The voltage signal 49a . . . e shown at bottom right in FIG. 5 results for the curved chopping knife 8 in the depicted embodiment example. Voltage signal 49a . . . e is shown here over the angle position 57 of the chopping knife 8 relative to the respective sensor arrangement 23a,b, and the angle position 0° describes the central position of the chopping knife 8 in front of the respective sensor arrangement 23a,b.

It will be noted that the described characteristic areas 51, 53, 55 induce voltages 49a . . . e of different levels. The area 51, 52 describing the roundness of the knife tip induces the highest total voltage 49a . . . e. It will be noted at the same time that the size of the air gap 33 has an influence on the induced voltage 49a . . . e. As expected, the value of the induced voltage 49a . . . e decreases as air gap 33 increases.

The signal shape of the induced voltage 49a . . . e is acquired and separated for every knife. This means that a plurality of voltage signals 49a . . . e are available for each chopping knife 8 depending on the configuration of the sensor arrangement 23a,b. According to FIG. 3, every magnetic pole 30 of the pole arrangement 27 generates an induced voltage 38a . . . e. These induced voltages 38a . . . e are then subjected to the frequency analysis 41 according to the invention by means of Fourier analysis 47 in the evaluating unit 36 after conversion into the voltage signals 49a . . . e described above. As has already been described, the Fourier analysis 47 separates these voltage signals 49a . . . e into frequency components 42 of a fundamental oscillation 45 and frequency components 42 of one or more superposed oscillations 46, or harmonics 50, which cause the signal distortion.

Figure 6:
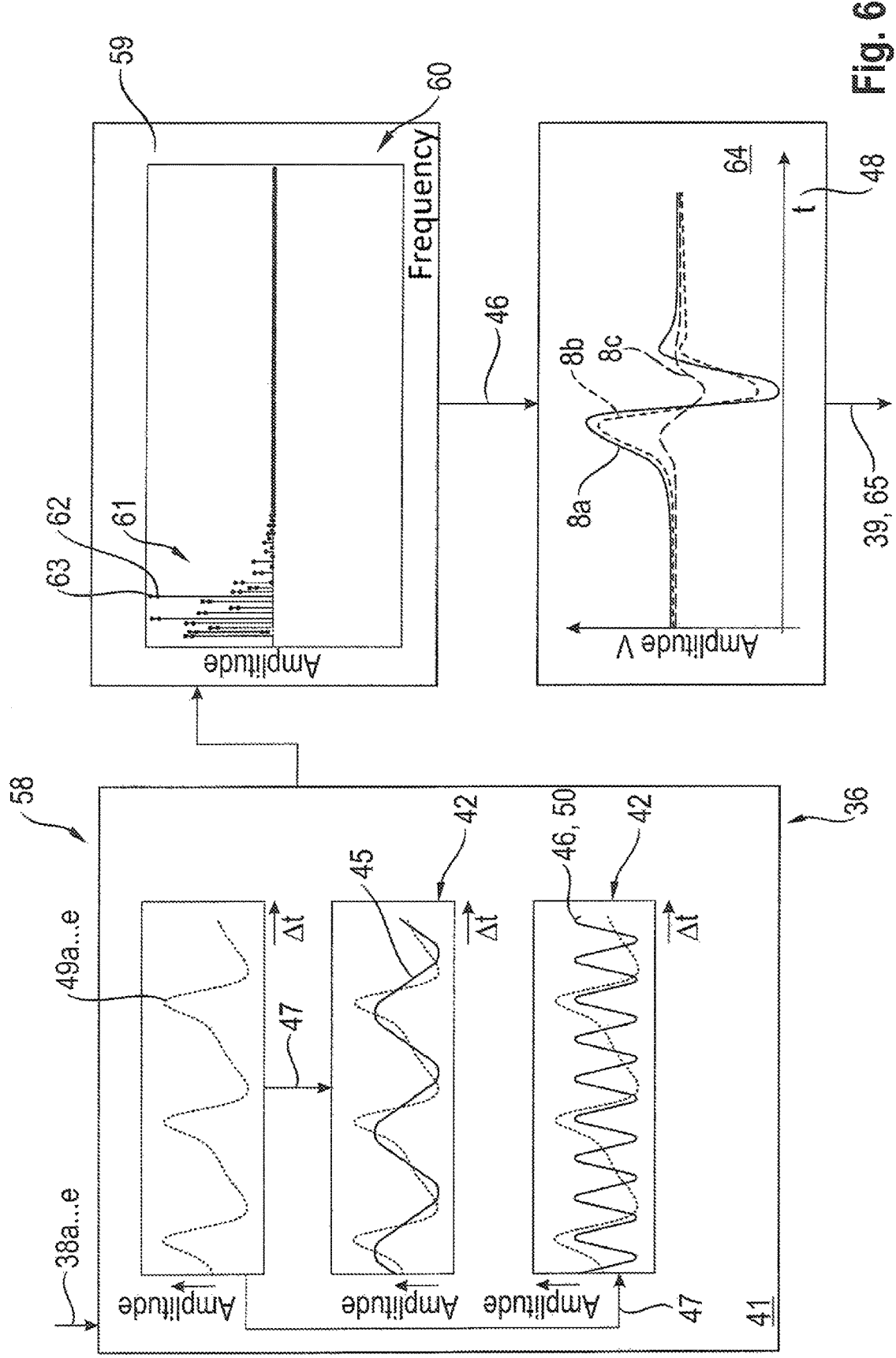
FIG. 6 shows a further detailed view of the frequency analysis according to the invention.

FIG. 6 describes the individual steps of the frequency analysis 41 in detail. In the first analysis step 58, the induced voltages 38a . . . e are subjected to a Fourier analysis 47 as voltage signals 49a . . . e in the manner already described, and the fundamental oscillation 45 and superposed oscillation 46 determine approximately one or more of the harmonics 50. The frequency analysis 60 shown in a further analysis step 59 shows that the amplitudes 61 of sharp knives 62 differ only insignificantly from those of blunt knives 63 regardless of whether the oscillation is a fundamental oscillation 45 or a superposed oscillation 46. In the subsequent analysis step 64, the determined fundamental oscillation 45 is no longer taken into account according to the invention, and only the frequency components 42 of the superposed oscillations 46 causing a signal distortion are inverse-transformed in the time domain 48. The results of this inverse-transformation are visualized in an exemplary manner in analysis step 64 with the example of three chopping knives 8 with chopping performance of different lengths. Chopping knife 8a has the highest chopping performance, while chopping knife 8b delivered approximately 40% of the chopping performance of chopping knife 8a, and chopping knife 8c delivered only approximately 10% of the chopping performance of chopping knife 8a. Consequently, the wear status 39 and, therefore, the cutting sharpness 65 of each chopping knife 8 can be deduced from the inverse-transformed frequency components 42 of the superposed oscillations 46.

Figure 7:
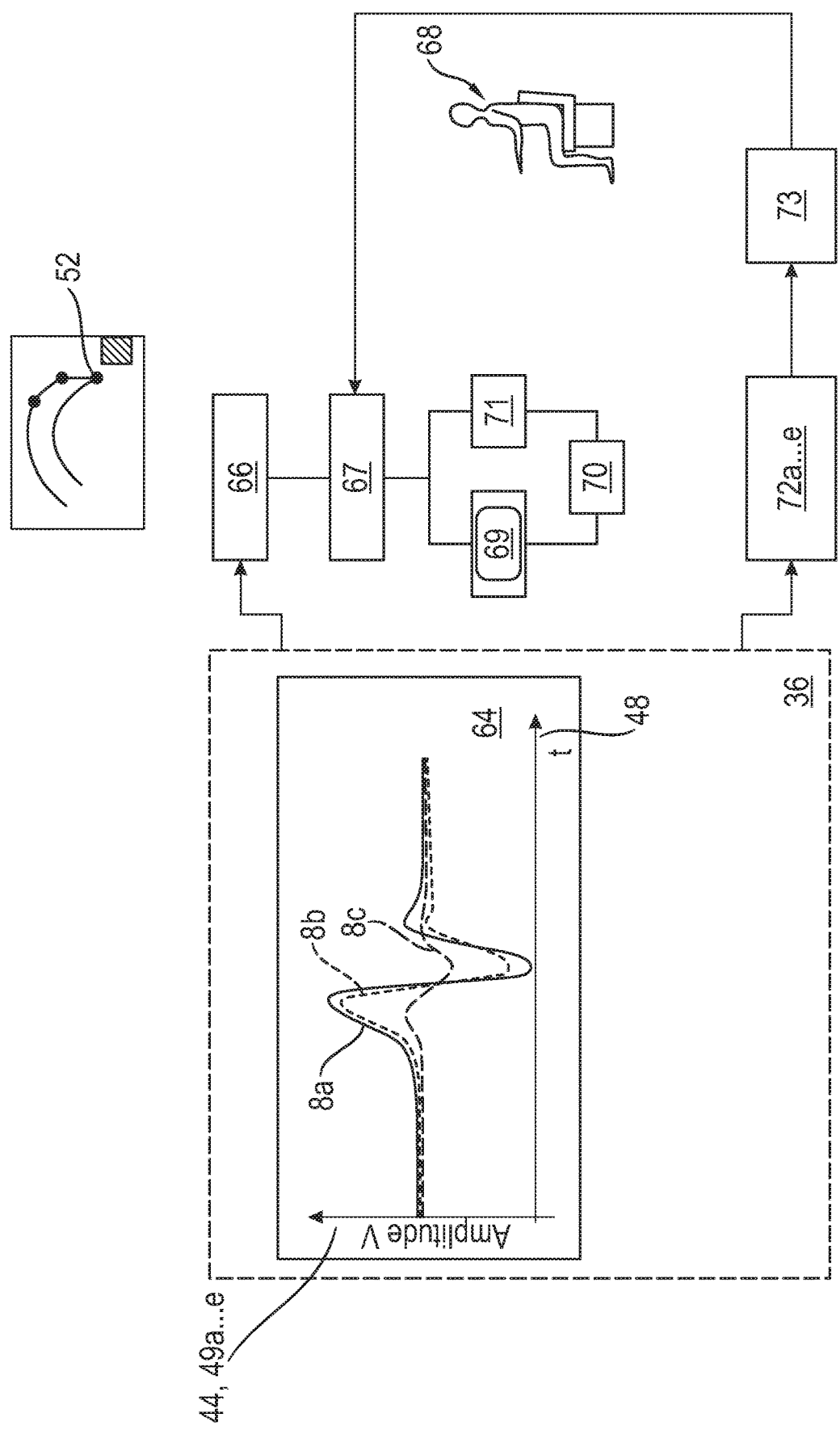
FIG. 7 shows a schematic view of a use of the frequency analysis according to the invention.

FIG. 7 schematically shows the implementation of a cutting sharpness adjustment. As already stated, the amplitude 44 of the respective induced voltage 38a . . . e and the voltage signal 49a . . . e derived therefrom form a measurement for the wear status 39 and, analogously, the cutting sharpness 65 of a chopping knife 8. Usually, a chopping knife 8 counts as sharp when the roundness (the radius) of the knife tip 52 amounts to approximately 0.04 mm. The amplitudes 44 of the chopping knives 8a . . . c shown by way of example in FIG. 7 correspond to radii of the knife tip 52 of approximately 0.1 mm-0.25 mm-0.6 mm, and an increasing roundness 52 corresponds to an increasing wear 39 and a decreasing cutting sharpness 65. In the simplest case, a "sharp knife" reference value 66 can now be stored in the evaluating unit 36 or other data processing device, including an external data processing device. In the simplest case, this reference value is a stored reference value 66 of the amplitude 44 of the induced voltage 38a . . . e, 49a . . . e. If the value falls below reference value 66, a grinding signal 67 is then generated. In this case, as will be explained in the following, this grinding signal 67 can conceivably be generated in different ways. In the simplest case, the chopping knife or chopping knives 8 which have fallen below the "sharp knife" threshold value can be displayed to an operator 68 on a display 69. In this case, the operator decides when a grinding process 70 of the chopping knives 8 is to be initiated. However, it is also conceivable that a control device 71 monitors the adherence to the "sharp knife" reference value 66 and automatically initiates the grinding process 70. The automatic initiation of the grinding process 70 is preferably defined such that a minimum number of chopping knives 8 must fall below the reference value 66 before a grinding process 70 is activated. In a manner known per se, it is also taken into account that the forage harvester 2 is not in a working mode in that crop 5 is moved through the forage harvester 2.

Alternatively or additionally, the assessment of the wear status 39 or of the cutting sharpness 65 can also be coupled to evaluation criteria 72. Preferably, the evaluation criteria can be one or more of the evaluation criteria comprising "grinding surface length 54 of the respective chopping knife 8" 72a, "roundness of the chopping knife tip 52" 72b, "general knife wear 39" 72c and/or "camber of the chopping knife 8" 72d or "relative distance of the shear bar 11 from the chopping knife 8" 72e. Analogous to the preceding description, a reference value 73 can also be stored in the evaluating unit 36 or other data processing device, including an external data processing device, with respect to the evaluation criteria 72a . . . e. In the simplest case, this is a stored reference value 73 of the amplitude 44 of the induced voltage 38a . . . e, 49a . . . e. Depending on the selected evaluation criterion or individual stored evaluation criterion 72a . . . e, the stored reference value 73 is then either a measurement for the wear status 39 of the respective chopping knife 8 in total or for the sharpness of the cutting edge 24. If the value falls below the reference value 73, the grinding signal 67 described above is generated. This grinding signal 73 can then conceivably be generated in different ways. In the simplest case, the chopping knife or chopping knives 8 which have fallen below the reference value 73 can be displayed to an operator 68 on a display 69. In this case, the operator decides when a grinding process 70 of the chopping knives 8 is to be initiated. However, it is also conceivable that a control device 71 monitors the adherence to reference value 73 and automatically initiates the grinding process 70. The automatic initiation of the grinding process 70 is preferably defined such that a minimum number of chopping knives 8 must fall below the reference value 73 before a grinding process 70 is activated. It is also taken into account in a manner known per se that the forage harvester 2 is not in a working mode in that crop 5 is moved through the forage harvester 2.

Alternatively or additionally, when the value falls below the reference value 66 or reference value 73, replacement of a chopping knife 8 can be suggested, namely, preferably when measurements fall below reference value 66, 73 to such an extent that it can be inferred that the respective chopping knife 8 is at the end of its usable range.

In view of the fact that the induced voltage 38a . . . e, i.e., the voltage signal 49a . . . e derived therefrom increases with increasing roundness 52 of the cutting edge 24 of the chopping knives 8, it is provided that the reference value 73 is an amplitude 44 of the determined voltage signal 49 when the "roundness of the chopping knife tip 52" evaluation criterion 72b is selected.

Since the oscillation period 43 of the induced voltage 38a . . . e increases with increasing grinding surface length 54 of the chopping knife 8, the reference value 73 is an oscillation period 43 of the derived voltage signal 49a . . . e when the "grinding surface length 54 of the respective chopping knife 8" evaluation criterion 72a is selected.

Due to the fact that the oscillation period 43 and the amplitude 44 of the induced voltage 39a . . . e both increase significantly with increasing general wear 39 of chopping knife 8, reference value 73 is an amplitude 44 and an oscillation period 43 of the determined voltage signal 49a . . . e when the "general knife wear" evaluation criterion 72c is selected.

The distance of the chopping knife 8 from the shear bar 11 increases and the amplitude 44 of the induced voltage 38a . . . e decreases significantly with increasing wear 39 of the chopping knife 8 so that when the "camber of the chopping knife 8" or "relative distance of the shear bar 11 from the chopping knife 8" evaluation criterion 72d, e is selected, reference value 73 is an amplitude of the determined voltage signal 49a . . . e.

REFERENCE CHARACTERS 1 agricultural work machine
2 forage harvester
3 header
4 gathering and pre-compacting rollers
5 crop flow
6 chopping device
7 chopping drum
8 chopping knife
9 chopping knife arrangement a . . . b
10 feed-in area
11 shear bar
12 cracker
13 after-comminution device
14 after-acceleration device
15 deflector
16 deflector flap
20 rotational axis of the chopping drum
21 drum base
22 rear drum wall
23 sensor arrangement a . . . b
24 cutting edge
25 induction sensor
26 magnetic exciter arrangement
27 pole arrangement
28 detection arrangement
29 flux conducting device
30 magnetic pole
31 pole surface
32 air gap arrangement
33 air gap
34 magnetic circuit
35 measuring arrangement
36 evaluating unit
37 measured magnetic value
38 reference value of induced voltage
38a.e induced voltage
39 wear status
40 rotational direction
41 frequency analysis
42 frequency component
43 oscillation period/phase
44 amplitude
45 fundamental oscillation
46 superposed oscillation
47 Fourier analysis
48 time domain
49 voltage signal a . . . e
50 harmonic
51 first area
52 roundness of the knife tip
53 further area
54 grinding surface length
55 third area
56 back of knife
57 angle position
58 first analysis step
59 further analysis step
60 frequency analysis
61 amplitude
62 sharp knife
63 blunt knife
64 analysis step
65 cutting sharpness
66 "sharp knife" reference value
67 grinding signal
68 operator
69 display
70 grinding process
71 control device
72 evaluation criterion a . . . e
73 reference value
L1.L4 sections

What is claimed is:
1. A detection arrangement for detecting a wear status of a chopping knife arrangement of a chopping device provided for processing a product flow, wherein the chopping device has a revolving chopping drum receiving the chopping knife arrangement and at least one shear bar which cooperates with chopping knives of the chopping knife arrangement, wherein the detection arrangement comprises:
at least one sensor arrangement which has a magnetic exciter arrangement and a flux conducting device magnetically coupled thereto, wherein the sensor arrangement provides a pole arrangement which forms at least one magnetic pole with a pole surface for conducting magnetic flux, wherein the sensor arrangement is configured such that at least a portion of the chopping knife passes the pole arrangement during a rotation of the chopping drum, the chopping knife passing the pole arrangement forms an air gap arrangement with at least one air gap with respect to the pole arrangement, and at least one magnetic circuit excited by the exciter arrangement is accordingly closed via the respective chopping knife,
a measuring arrangement, and an evaluating unit, wherein the measuring arrangement is configured to detect at least one measured magnetic value pertaining to the magnetic flux in at least one magnetic circuit excited by the exciter arrangement, wherein voltage induced when a chopping knife arrangement passes the sensor arrangement forms the measured magnetic value, and
wherein the evaluating unit is configured to determine the wear status of the respective chopping knife from the at least one detected measured magnetic value by
determining the induced voltage and recording the induced voltage as a voltage signal,
resolving the voltage signal into its frequency components by means of frequency analysis,
separating the frequency components into frequency components of a fundamental oscillation and into frequency components of a superposed oscillation which cause signal distortion, inverse-transforming the separated frequency components of the superposed oscillation which cause a signal distortion in a time domain, and deriving a measurement for the wear status or cutting sharpness of the chopping knife from the inverse-transformed frequency components of the superposed oscillation.

2. The detection arrangement for detecting a wear status of a chopping knife arrangement according to claim 1, wherein the frequency components comprise the amplitude and the phase of the respective voltage signal.

3. The detection arrangement for detecting a wear status of a chopping knife arrangement according to claim 1, wherein the frequency analysis of the voltage signal is carried out by means of Fourier analysis.

4. The detection arrangement for detecting a wear status of a chopping knife arrangement according to claim 1, wherein a plurality of induction sensors are associated with each sensor arrangement, and each induction sensor generates a voltage signal, wherein each of the generated voltage signals is analyzed separately, and wherein a plurality of voltage signals, or all of the voltage signals, of a detected chopping knife are combined to form one or more voltage signals prior to an analysis.

5. The detection arrangement for detecting a wear status of a chopping knife arrangement according to claim 1, wherein the respective voltage signal is classified into frequency components of a fundamental oscillation and frequency components of a superposed oscillation which cause signal distortions, and wherein the frequency components representing the fundamental oscillation are not taken into account in the derivation of the wear status or of the cutting sharpness of the respective chopping knife.

6. The detection arrangement for detecting a wear status of a chopping knife arrangement according to claim 5, wherein an amplitude of the respective voltage signal of the frequency components causing a signal distortion forms a measurement for assessing the wear status and/or cutting sharpness of the respective chopping knife.

7. The detection arrangement for detecting a wear status of a chopping knife arrangement according to claim 1, wherein the at least one sensor arrangement is configured to be positioned at a circumference of the chopping drum such that every chopping knife of the chopping drum is detected by means of the at least one sensor arrangement.

8. The detection arrangement for detecting a wear status of a chopping knife arrangement according to claim 7, wherein right-hand-side and left-hand-side chopping knife arrangements are associated with the chopping drum, and at least one sensor arrangement is associated with each of said chopping knife arrangements.

9. The detection arrangement for detecting a wear status of a chopping knife arrangement according to claim 1, wherein a reference value indicating a sharp knife is stored in the evaluating unit or in another data processing device, and wherein when the wear status of a chopping knife falls below this reference value, the detection arrangement is configured to generate a grinding signal, and wherein the reference value forms an amplitude of a voltage signal indicating a sharp knife.

10. The detection arrangement for detecting a wear status of a chopping knife arrangement according to claim 9, wherein the generation of a grinding signal includes the generation of an informatory signal that comprises a visualization of that chopping knife that falls below the reference value.

11. The detection arrangement for detecting a wear status of a chopping knife arrangement according to claim 9, wherein the generation of a grinding signal further includes a triggering of a grinding process.

12. The detection arrangement for detecting a wear status of a chopping knife arrangement according to claim 1, wherein the assessment of the cutting sharpness or wear status is effected by means of evaluation criteria selected from the group consisting of grinding surface length of the respective chopping knife, roundness of the chopping knife tip, general knife wear, camber of the chopping knife and relative distance of the shear bar from the chopping knife.

13. The detection arrangement for detecting a wear status of a chopping knife arrangement according to claim 12, wherein the reference value is an amplitude of a voltage signal indicating roundness of the chopping knife tip.

14. The detection arrangement for detecting a wear status of a chopping knife arrangement according to claim 12, wherein the reference value is an oscillation period of a voltage indicating grinding surface length of the respective chopping knife.

15. The detection arrangement for detecting a wear status of a chopping knife arrangement according to claim 12, wherein the reference value comprises an amplitude and an oscillation period of a voltage signal indicating general knife wear.

16. The detection arrangement for detecting a wear status of a chopping knife arrangement according to claim 12, wherein the reference value is an amplitude of a voltage signal indicating camber of the chopping knife or relative distance of the shear bar from the chopping knife.

17. The detection arrangement for detecting a wear status of a chopping knife arrangement according to claim 12, wherein a reference value is stored in the evaluating unit and/or some other data processing device for every evaluation criterion, and ii wherein the detection arrangement is configured to generate a grinding signal or a knife change signal when the wear status falls below this reference value, wherein the reference value being an amplitude of a voltage signal indicating grinding or a knife change.

18. The detection arrangement for detecting a wear status of a chopping knife arrangement according to claim 17, wherein the generation of a grinding signal includes the generation of an informatory signal in the form of a visualization of that chopping knife falling below the reference value.

19. The detection arrangement for detecting a wear status of a chopping knife arrangement according to claim 18, wherein the generation of a grinding signal further comprises a triggering of a grinding process or a signal to exchange a chopping knife.

* * * * *